United States Patent [19]
Platusich et al.

[11] Patent Number: 5,524,674
[45] Date of Patent: Jun. 11, 1996

[54] INDUCTIVE WELDING OF THERMOPLASTIC PIPE

[75] Inventors: Bruce M. Platusich, Bristol, Ind.; Dennis E. McAtamney, Roseville, Mich.

[73] Assignee: Nibco Inc., Elkhart, Ind.

[21] Appl. No.: 455,913

[22] Filed: May 31, 1995

Related U.S. Application Data

[62] Division of Ser. No. 74,050, Jun. 8, 1993, Pat. No. 5,503,192.

[51] Int. Cl.⁶ ..................................... F16L 47/02
[52] U.S. Cl. ............. 138/113; 138/114; 138/108; 138/148; 285/133.1; 285/179
[58] Field of Search ............ 138/111–115, 108, 138/148; 156/158, 304.2, 304.3, 304.6, 273.9; 283/133.1, 138, 284, 423, 21, 22; 285/179

[56] References Cited

U.S. PATENT DOCUMENTS

| | | | |
|---|---|---|---|
| 3,238,346 | 3/1966 | Savko | 219/10.53 |
| 3,574,357 | 4/1971 | Tirgoviste | 285/47 |
| 3,677,303 | 7/1972 | Martin | 138/109 |
| 3,685,546 | 8/1972 | Sigmund | 138/141 |
| 3,899,007 | 8/1975 | Miller | 138/114 |
| 4,487,660 | 12/1984 | Netzel | 174/28 |
| 4,531,552 | 7/1985 | Kim | 138/149 |
| 4,571,472 | 2/1986 | Pollack | 219/9.5 |
| 4,573,527 | 3/1986 | McDonough | 165/154 |
| 4,786,088 | 11/1988 | Ziu | 285/138 |
| 4,886,305 | 12/1989 | Martin | 138/113 X |
| 4,930,544 | 6/1990 | Ziu | 138/113 |
| 5,018,260 | 5/1991 | Ziu | 24/335 |
| 5,085,471 | 2/1992 | Ziu | 285/133 |
| 5,087,308 | 2/1992 | Wermelinger | 156/158 |
| 5,184,850 | 2/1993 | Wermelinger | 285/133.1 X |
| 5,186,502 | 2/1993 | Martin | 138/113 X |
| 5,402,831 | 4/1995 | Hollis | 138/113 |
| 5,419,593 | 5/1995 | Greene et al. | 138/114 X |
| 5,449,204 | 9/1995 | Greene et al. | 285/133.1 |

FOREIGN PATENT DOCUMENTS

| | | | |
|---|---|---|---|
| 1030205 | 3/1989 | China . | |
| 0048065 | 3/1982 | European Pat. Off. | B29C 65/34 |
| 0406818 | 1/1991 | European Pat. Off. | F16L 47/02 |
| 1493562 | 7/1967 | France . | |
| 2400659 | 3/1979 | France | F16L 21/00 |
| 43897 | 3/1966 | German Dem. Rep. . | |
| 3836326 | 4/1990 | Germany | F16L 39/00 |
| 136756 | 4/1976 | Japan . | |
| 159036 | 4/1985 | Japan . | |
| 109996 | 6/1986 | Japan . | |
| 62-53336 | 11/1987 | Japan . | |
| 272535 | 9/1988 | Japan . | |
| 6442583 | 2/1989 | Japan . | |
| 199071 | 12/1989 | Japan . | |
| 8102405 | 9/1981 | WIPO | B29C 27/04 |

OTHER PUBLICATIONS

PCT WO89/05230 Raychem Corporation Inventors—McMills, et al. Bonding Method and Devices Employing Conductive Polymers Jun. 15, 1989.

*Primary Examiner*—Patrick Brinson
*Attorney, Agent, or Firm*—Price, Heneveld, Cooper, DeWitt & Litton

[57] ABSTRACT

Forming a novel double containment polymeric piping assembly by interfitting slidably interfittable polymeric inner pipe components, including a first induction responsive layer therebetween, and slidably interfittable polymeric outer pipe components, preferably including a second induction responsive layer therebetween, to form an inner connection and an outer connection, while causing the inner connection to be axially offset from the outer connection, applying an electrical induction force around the periphery of the outer pipe components, axially aligned with the inner connection but not with said outer connection, and thereby fusing the inner pipe components and the first polymeric layer together, and moving the components relative to said electrical induction force, axially away from the inner connection, and axially aligned with the outer connection, applying an inductive force around the periphery of the outer pipe components, and thereby fusing the outer pipe components and the second polymeric layer together.

7 Claims, 3 Drawing Sheets

5,524,674

1

INDUCTIVE WELDING OF THERMOPLASTIC PIPE

This is a divisional application Ser. No. 08/074,050 filed on Jun. 8, 1993 now U.S. Pat. No. 5,503,192.

BACKGROUND OF THE INVENTION

This invention relates to double containment piping, and more particularly to fabrication of double containment polymeric piping components and systems.

Double containment piping systems are used for a variety of purposes, one of which is for safety reasons, the outer conduit serving as a container for any leakage of fluid, e.g., chemicals, from the inner conduit. The outer conduit is typically substantially larger than the inner conduit, so that there is a significant space between them. This space is typically maintained by annular spacers. Although double containment piping systems are highly useful, a substantial difficulty with such systems is that of assembly. The inner conduit components, including elbows, nipples, couplings and pipe, must be assembled inside the outer conduit components, hoping that all connections on the inside are sealed so as to be leakproof. Making assembly connections and sealed joints is particularly complex and labor intensive. Labor intensive operations involve three particular concomitant disadvantages, the first being increased percentage of human error, the second being significantly higher cost, and the third being the tediousness of the labor. The connections can be bonded together by a solvent-type adhesive, or by fusion bonding or welding. The former releases solvent fumes while the latter requires manual labor to make blind joints.

SUMMARY OF THE INVENTION

An object of this invention is to provide a method of assembling double containment piping systems in a manner enabling rapid simple assembly to produce effectively sealed joints on both the inner and outer conduits. Tests have shown that the method assuredly seals all of the joints and markedly reduces tedious manual labor. In fact, no leaky joints have been found to occur in all of the tests performed. Moreover, labor can be reduced by as much as 90% over conventional methods. This eliminates most of the labor tedium and substantially lowers cost.

The invention provides a novel method of assembling polymeric double containment piping systems easily, rapidly and reliably, even with peculiar piping configurations and use of unusual combinations of piping components. The invention can be used for both pressure and drainage-type conduits.

The method employs the steps of providing an inner annular layer of induction responsive polymer between the telescopically interfitted components of the inner conduit and, in some installations, an outer layer of induction responsive polymer between the telescopically interfitted components of the outer conduit, causing the inner conduit connections to be axially offset from the outer conduit connections, positioning an induction coil peripherally around the outer conduit but aligned with the inner layer, and induction activating the inner layer at the inner conduit connections to fuse and bond the inner connections together, and then moving the induction coil axially along the outer conduit until aligned with the outer layer and induction activating the outer layer at the outer connections to fuse the

2 outer connections together. No solvents are released into the atmosphere.

The resulting novel polymeric double piping system has inner sealed connections axially offset from outer sealed connections.

These and other objects, advantages and features of the invention will become apparent upon studying the following specification in conjunction with the drawings.

DESCRIPTION OF THE PREFERRED EMBODIMENT

Figure 1:
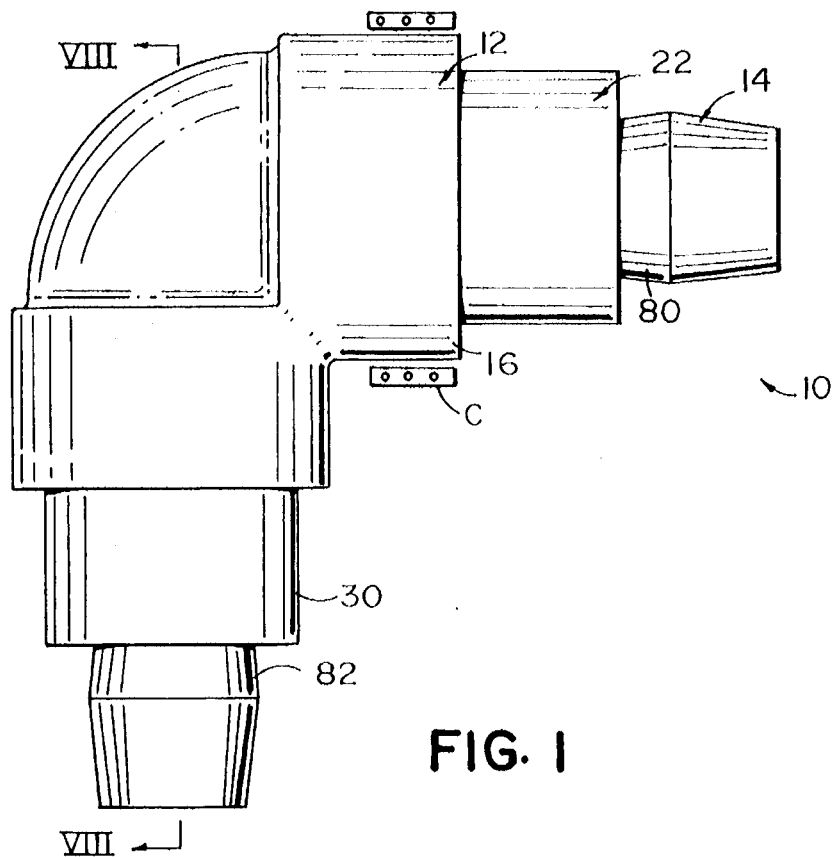
FIG. 1 is a side elevational view of one form of double containment piping assembly made in accordance with this invention.
Figure 2:
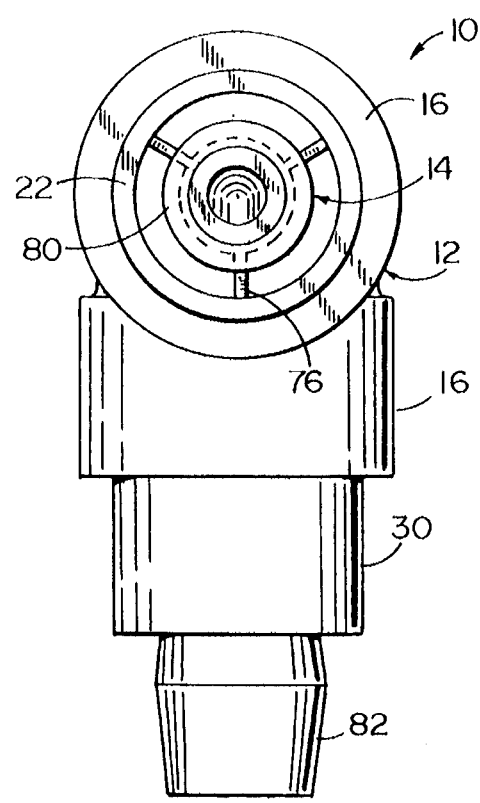
FIG. 2 is an end elevational view of the assembly in FIG. 1.
Figure 3:
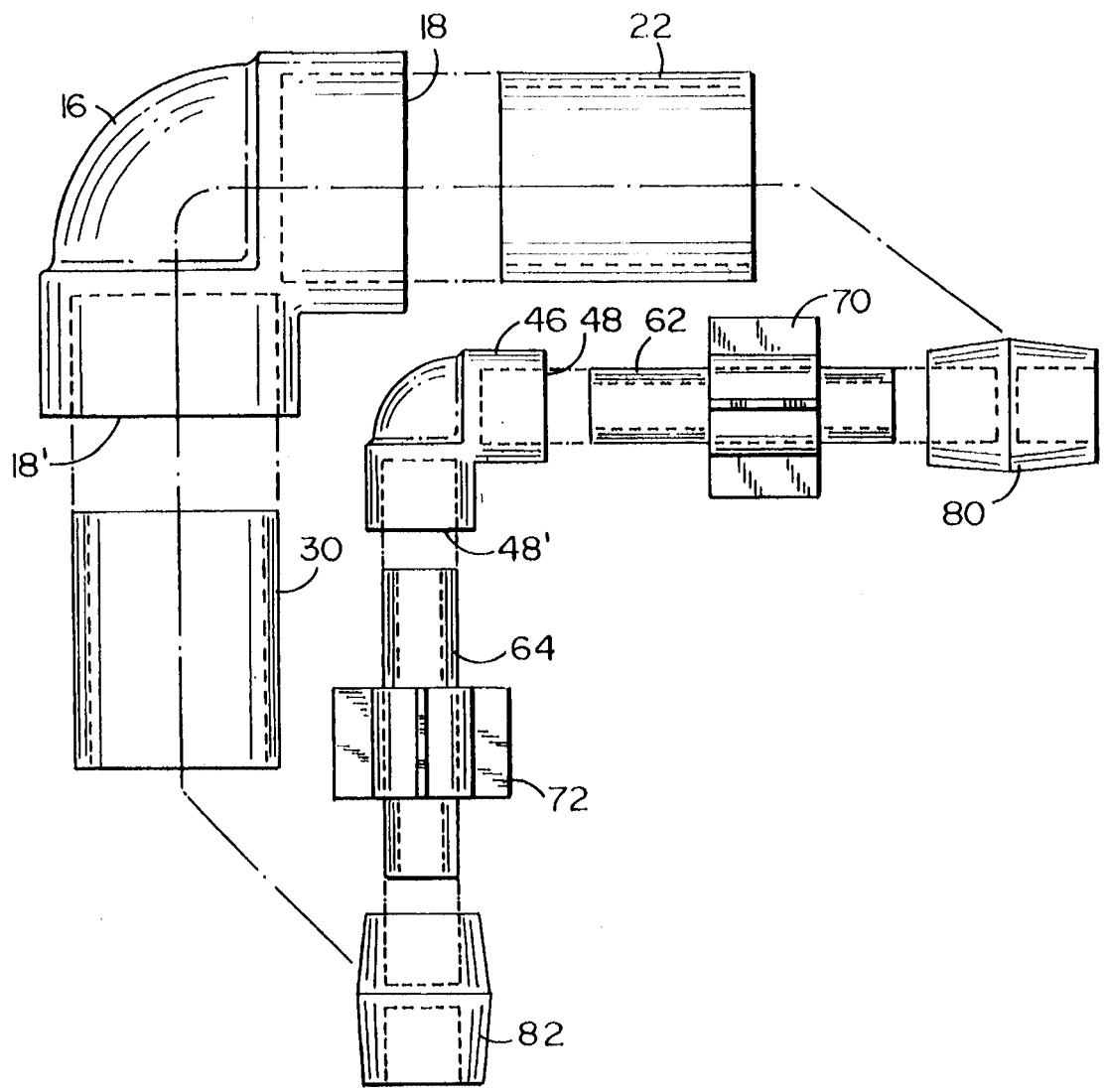
FIG. 3 is an exploded view of the components of the assembly in FIGS. 1 and 2.
Figure 4:
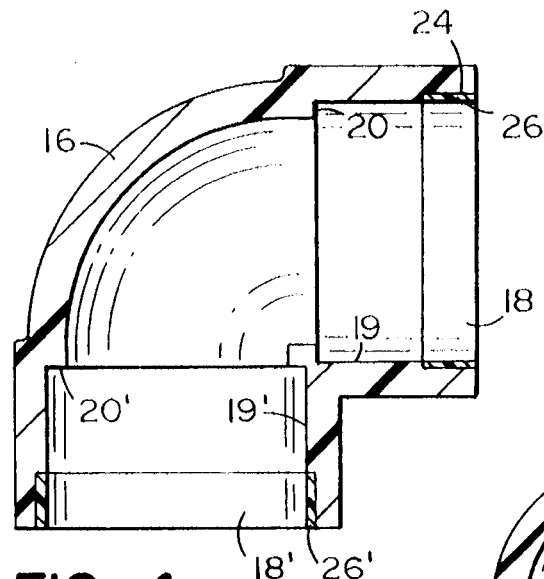
FIG. 4 is a sectional elevational view of the outer pipe elbow component of this assembly.
Figure 5:
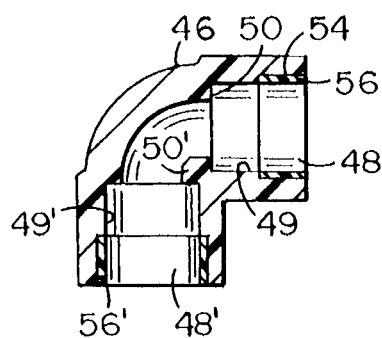
FIG. 5 is a sectional elevational view of the inner elbow component.

As noted previously, conventional assembly of double containment piping systems has basically been performed by applying to the components to be joined an adhesive material and curing the adhesive, or thermal fusion bonding. As such, the sequential assembly of the piping components is tedious, difficult, time consuming and labor intensive. In the drawings are illustrated some typical and representative components of a double containment piping system 10 which includes polymeric outer pipe components 12 and polymeric inner pipe components 14. Elbow assemblies like those depicted are particularly difficult to assemble using present technology and thus are set forth herein as exemplary of the components of a large complex system.

The outer pipe components are shown to include a large outer elbow 16 having two openings on axes at an angle, e.g. 90°, to each other, the openings being essentially alike in the embodiment depicted. Conceivably the elbow could be a reducer elbow in the concept presented, as will be readily understood from the description herein set forth. Opening 18 is adapted to slidably telescopically receive one end of coupling 22 therein, the insertion of which is limited by abutment of the inner end of coupling 22 with an integral, axially facing, annular shoulder 20 spaced inwardly a predetermined distance from the outer edge of opening 18. The outer end of opening 18 has an annular gap 24 on its inner periphery, and which contains a ring 26 of flexible, adherent, inductively responsive material, preferably a layer of tape-like polymer containing metal particles therein. Preferably the polymer-to-metal particle ratio is about 50/50 on a weight-to-weight basis. The polymer has a tacky outer surface so as to temporarily adhere to the peripheral wall surface of gap 24. The thickness of this tape or like strip material is chosen to cause the inner surface thereof, when applied, to align with the remainder of opening 18 inwardly of the tape, so as to have basically the same inner diameter and circumference as the adjacent inner surface 19. These inner diameter and circumference dimensions are substantially the same as the outer diameter and circumference dimensions of the corresponding end of coupling 22.

The opposite opening 18' of elbow 16 likewise has a layer of flexible, polymeric material 26' having a tacky outer surface and containing metal particles. Layer 26' has a diameter and a circumference substantially the same as that of surface 19' axially inwardly of elbow 16. Annular shoulder 20' limits the insertion of one end of coupling 30 which is telescopically interfittable with opening 18'. The received end of coupling 30 has an outer diameter and an outer circumference substantially the same as the inner diameter and circumference of layer 26'. Elbow 16 defines a passageway therethrough for receiving the inner pipe components 14. The layer of polymer 26 is preferably of the same polymer as elbow 16 and coupling 22. The induction responsive material, usually metal particles, are preferably embedded therein, the most preferred metal particles being of stainless steel so as to not be susceptible to corrosion in the event some particles thereof are exposed on the surface of the polymer and being, for example, grit of 400 series. The preferred polymer is polypropylene. Other polymers can be employed within the concept presented, e.g., polyvinylchloride (PVC), chlorinated polyvinyl chloride (CPVC); polyethylene (PE); polyvinylidene fluoride (PVDF); melt processable fluorocarbons (ECTFE) and others. If low frequency induction is to be employed, the induction responsive layer is made to be electrically conductive as by having an electrically conductive material such as a metal screen embedded therein. Alternatively, it could be electrically conductive by having sufficient conductive fibers of carbon or metal as to overlap and engage each other. One type of electric conductive polymer tape using a PVC blend is known by the trademark INCOBLEND, by Allied Signal Co. If metal particles are the basis for making the polymeric layer induction responsive, high frequency induction should be used, as is known in the trade.

Contained within the arcuate portion of the passageway of elbow 16 is an inner pipe elbow 46 which is significantly smaller in its outer dimensions than the inner diameter passage dimensions in elbow 16, forming an annular space therebetween. Inner elbow 46 is inserted into the passage of elbow 16 so that its openings 48 and 48' align axially and concentrically with openings 18 and 18'. Opening 48 also includes a peripheral wall 49 basically the same size as the peripheral wall of one end of coupling 62 to be received thereby to a depth limited by axially facing annular shoulder 50. Within the outer end portion of surface 49 is an annular gap 54 containing an induction responsive layer of flexible polymeric material 56 of a thickness to cause the inner diameter of layer 56 to be substantially the same as that of the adjacent inner surface 49. The opposite end opening 48' has an annular gap 54' likewise filled with an induction responsive annular polymeric layer 56', e.g., containing metal particles. Layer 56' has an inner diameter substantially the same as that of adjacent surface 49'.

Figure 7:
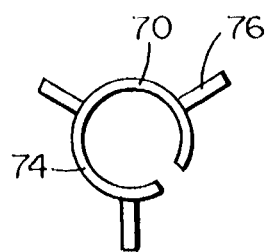
FIG. 7 is an end elevational view of a peripheral spacer.

As with the outer elbow, polymer layer 56 is preferably of the same polymer as elbow 46, e.g., polypropylene, and preferably contains stainless steel metal particles as the inductively responsive material in the layer. Likewise, opening 48' of elbow 46 includes an annular polymeric layer 56' around opening 48', having substantially the same inner diameter as the inward adjacent surface 49' of this opening. An annular, axial shoulder 50' at the inner end of surface 49' limits the insertion of polymeric coupling 64. Each of couplings 62 and 64 is shown to have a peripheral spider-type spacer 70 and 72, respectively, therearound, the spacer being of any of several conventional types available, e.g., that shown in U.S. Pat. No. 5,018,260. These spacers fix the concentric location of the inner pipe components relative to the outer pipe components by having an inner split ring, e.g., 74 (FIG. 7), which slides onto and/or snaps onto the inner pipe coupling 62, and has a plurality of radially extending flanges or legs 76 for abutment with the inner periphery of the outer pipe component in which the element is located, here coupling 22.

Figure 6:
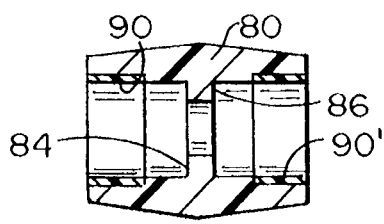
FIG. 6 is a sectional elevational view of the inner pipe nipple illustrated.
Figure 8:
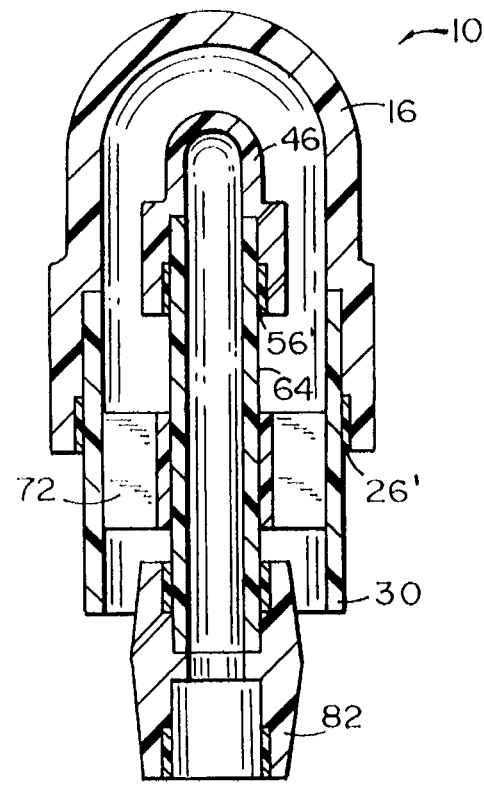
FIG. 8 is a sectional view of the assembly taken on plane VIII—VIII of FIG. 1.

In the representative embodiment illustrated, there are two inner pipe nipples 80 and 82 which receive the ends of couplings 62 and 64 opposite the nipple ends fitted within elbow 46. Alternatively, couplings 62 and 64 could constitute the ends of elongated pipes. When nipples 80 and 82 are employed, these nipples include an inner end annular pair of shoulders 84 and 86, shown for example on nipple 80 in FIG. 6, to limit the insertion of couplings 62, for example, and to limit the insertion of a pipe (not shown) in the opposite end. To assure a seal being formed between coupling 62 and nipple 80, a layer of polymer 90 having metal particles therein forms an inner surface of the same diameter and periphery as coupling 62. A like layer 90' is applied on the opposite end.

When the components are assembled, the sliding telescopically interfitting connections preferably are slightly press fit to assure solid contact between the polymer of the components and the inductively responsive polymer layers placed therein.

Joining of the assembly components illustrated is basically as follows. Layers 26, 26', 56, 56', 90 and 90' are adhered in the appropriate annular gaps in the polymeric components. Small inner pipe elbow 46 is inserted generally at the curved portion of elbow 16, spaced from the walls of elbow 16. The inner coupling 62 and its spacer 70 are slidably inserted into outer coupling 22 and this subassembly inserted into opening 18 of elbow 16 until the inner end of coupling 62 slidably engages into small elbow 46 so that the axial end of coupling 62 abuts shoulder 50 of the inner pipe elbow, and layer 56 is in full engagement annularly with the outer periphery of coupling 62. Alternatively, instead of coupling 62 and spacer 70 being inserted into coupling 22, coupling 62 may first be inserted into end 48 of elbow 46 and then coupling 22 slid over spacer 70 and within opening 18 to engage layer 26, so that the outer pipe coupling 22 engages shoulder 20 of the elbow. The same sequence is employed for coupling 64, spacer 72, coupling 30 and elbows 16 and 46. If utilized, nipples 80 and 82 are then slid over the outer ends of couplings 62 and 64, respectively. Importantly, the inductively reactive strips in each axial arrangement, e.g., strip 26 in elbow 16, strip 56 in elbow 46, and strip 90 in nipple 80, are all axially offset from each other. The same is true of strips 26', 56' and a strip in nipple 82. This axial offset is important to the concept and the workability of this invention.

Next the assembled but unsealed pipe assembly is placed in an electrical induction coil C (shown schematically in FIG. 1) so that the coil is positioned around the outer pipe assembly in a location axially aligned with the inner pipe connection formed between coupling 62 and elbow 46, and specifically axially aligned with the polymeric layer 56. The induction coil is then activated to activate the metal particles in layer 56, causing the induction responsive polymer layer to heat, soften, fuse and bond to the adjacent polymer surfaces of elbow 46 and coupling 62. The time of coil actuation can vary depending on the size of the inner pipe components and spacing between the inner and outer pipe components, with a time between five and 30 seconds being typical. The particular amount of time and the amount of inductive force of the induction coil required for bonding can be determined for the dimension and softening temperature of the polymer utilized. It will also depend upon whether relatively low frequency or relatively high frequency current is employed. Next, axial movement of the components relative to the induction coil is caused to occur to axially align the coil with inner layer 90. The coil is then activated to soften layer 90 and bond nipple 80 to inner pipe 62. Because the induction coil is typically large and heavy, normally the pipe components will be moved relative to the coil rather than vice versa, in a manner to axially align the inner polymeric layers with the coil offset from the outer layers. After the inner pipe components are fused and sealed together, the pipe components are axially moved relative to the induction coil to align the coil with the outer pipe connections, specifically with polymeric layer 26 and then layer 26' offset from the inner pipe connections, the coil being activated to heat, soften and fuse the polymer to the adjacent surfaces of elbow 16 and couplings 22 and 30.

Repeated tests have shown that the resulting articles have all been leakproof, giving great confidence that the inner pipe fittings are all sealed. Moreover, the labor required to assemble the components has actually been reduced by about 90%.

Some installations may allow the use of other nonconductive, nonmetallic conduit components of a different material than the inner conduit components. Preferably the outer conduit components will be of a polymer, however. Further, because the outer conduit connections are easier to complete, they could in some instances be solvent adhesive bonded rather than induction bonded.

Those skilled in this art, after studying the above disclosure of the preferred embodiment, will readily see how this invention can be applied to various arrangements of double containment piping assemblies. Hence, the invention is not intended to be limited to the specific preferred embodiment illustrated as exemplary, but only by the scope of the appended claims and the reasonable equivalents thereto.

The embodiments of the invention in which an exclusive property or privilege is claimed are defined as follows:

1. A double containment piping assembly comprising:

an inner polymeric conduit subassembly having at least two inner conduit connections, each said inner conduit connection comprising telescopically interfitting inner polymeric elements having a first intermediate layer of induction responsive polymer bondable to said inner polymeric elements;

an outer polymeric conduit assembly having at least two connections, each said outer conduit connection comprising telescopically interfitting outer polymeric elements having a second intermediate layer of induction responsive polymer bondable to said outer polymeric elements;

said inner conduit connections being axially offset from said outer conduit connections; and said inner conduit connections being induction sealed together; and said outer conduit connections being induction sealed together.

2. The double containment piping assembly in claim 1 wherein said first intermediate layer for said inner polymeric elements is of the same polymer as said inner polymeric elements, and said second intermediate layer for said outer polymeric elements is of the same polymer as said outer polymeric elements.

3. The double containment piping assembly in claim 1 wherein said first and second intermediate layers contain metal particles.

4. The double containment piping assembly in claim 1 wherein said first and second intermediate layers are electrically conductive.

5. A double containment piping assembly comprising:

an inner polymeric conduit subassembly having at least two inner conduit connections, each said inner conduit connection comprising telescopically interfitting inner polymeric elements having a first intermediate layer of induction responsive polymer bondable to said inner polymeric elements;

an outer polymeric conduit assembly having at least two connections, each said outer conduit connection comprising telescopically interfitting outer polymeric elements;

said inner conduit connections being axially offset from said outer conduit connections; and said inner conduit connections being induction sealed together; and said outer conduit connections being sealed together.

6. The double containment piping assembly in claim 5 wherein said first intermediate layer for said inner polymeric elements is of the same polymer as said inner polymeric elements.

7. The double containment piping assembly in claim 5 wherein said intermediate layer contains metal particles.

* * * * *

UNITED STATES PATENT AND TRADEMARK OFFICE
CERTIFICATE OF CORRECTION

PATENT NO.  : 5,524,674
DATED       : June 11, 1996
INVENTOR    : Platusich et al.

It is certified that error appears in the above-identified patent and that said Letters Patent is hereby corrected as shown below:

Column 1, line 15;

"sewing" should be --serving--.

Column 3, line 66;

"50" should be --50'--.

Signed and Sealed this

Twenty-eighth Day of January, 1997

Attest:

BRUCE LEHMAN

Attesting Officer     Commissioner of Patents and Trademarks